No. 818,902. PATENTED APR. 24, 1906.
L. B. MOGNETT.
COAL FINDING INSTRUMENT.
APPLICATION FILED AUG. 24, 1904.
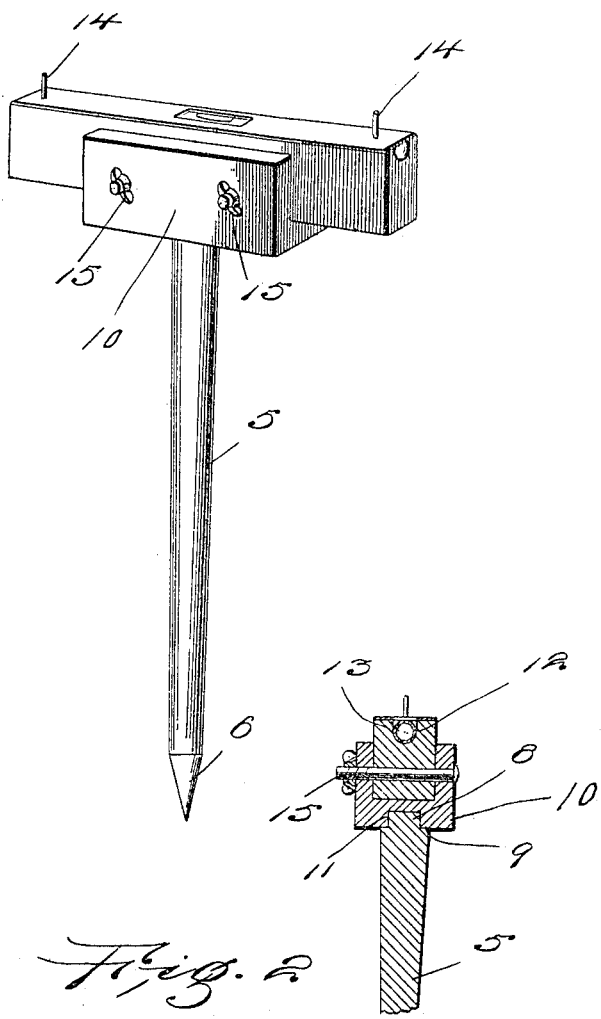

UNITED STATES PATENT OFFICE.

LEWIS B. MOGNETT, OF CRICKMER, WEST VIRGINIA.

COAL-FINDING INSTRUMENT.

No. 818,902.      Specification of Letters Patent.      Patented April 24, 1906.

Application filed August 24, 1904. Serial No. 221,958.

*To all whom it may concern:*

Be it known that I, LEWIS B. MOGNETT, a citizen of the United States, residing at Crickmer, in the county of Fayette, State of West Virginia, have invented certain new and useful Improvements in Coal-Finding Instruments; and I do hereby declare the following to be a full, clear, and exact description of the invention, such as will enable others skilled in the art to which it appertains to make and use the same.

This invention relates to coal-finding instruments; and it has for its object to provide an instrument which may be employed for locating a coal-seam from an outcropping.

A further object of the invention is to provide an instrument which will be extremely cheap and simple and which will be efficient in its operation.

In the drawings forming a portion of this specification, and in which like characters of reference indicate similar parts in both the views, Figure 1 is a perspective view showing an instrument embodying the present invention. Fig. 2 is a vertical section taken longitudinally through the head of the instrument.

Referring now to the drawings, the present instrument comprises a staff 5, at the lower end of which is fixed a metal point 6, so that the staff may be thrust into the ground to stand in erect position. The upper end of the staff 5 is reduced in diameter and formed round to form a spindle 8, at the base of which is the shoulder 9.

In connection with the staff of the instrument, as above described, there is employed a head 10 of rectangular elongated shape and in the center of the bottom of which is formed a socket 11, in which is received a spindle 8, which fits in the socket snugly, but permits of rotation of the head in a plane at right angles to the axis of the staff. In the upper face of the head 10 and longitudinally thereof is formed a channel 12, which opens through the ends of the head and which acts as a seat to receive the socket 13 of a spirit-level *a*, having sighting-points 14 at its end, these sighting-points touching a plane parallel with the axis of the spirit-level. Set-screws 15 may be provided in the side of the head for clamping the stock of the level in the channel or seat.

In the use of the instrument a start is made from an outcropping, and the staff is thrust into the ground so that the head may be horizontal and the sighting-points will top the plane of the outcropping. The outcropping is usually upon the same level at one side of the hill or mountain as upon the other side. Therefore after disposing the staff and head in the manner just explained the head is swung on the spindle or staff so that the sight may be taken in the direction of progress of the prospector, and a monument or marker (not shown) is set on the face of the hill or mountain where the sight strikes. The staff and its adjunctive parts are then taken to the monument or marker (not shown) and another survey is taken, such operation being continued until the outcropping is located at some other point than the point at which the start was made.

What is claimed is—

An instrument of the class described, comprising a staff, a head rotatably mounted upon the upper end of the staff, said head having a longitudinal channel in its upper face, a spirit-level disposed in said channel, and means piercing the sides of the said head for clamping the level in said channel.

In testimony whereof I affix my signature in presence of two witnesses.

LEWIS B. MOGNETT.

Witnesses:
    H. E. FOX,
    W. W. FOX.